UNITED STATES PATENT OFFICE.

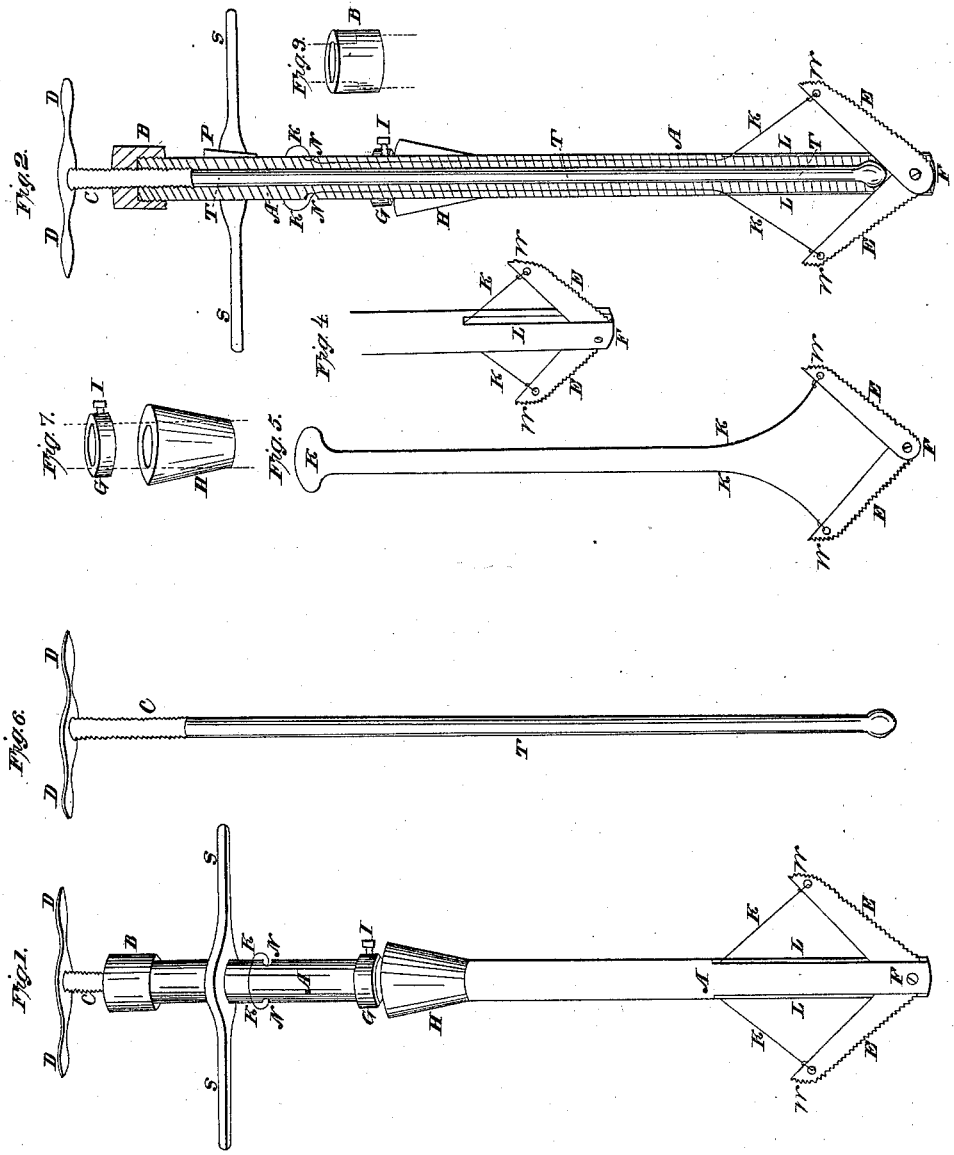

THOMAS S. SPEAKMAN AND RICHARD A. STRATTON, OF PHILADELPHIA, PENNSYLVANIA.

APPARATUS FOR BORING ROCKS OR EARTH.

Specification of Letters Patent No. 4,194, dated September 17, 1845.

*To all whom it may concern:*

Be it known that we, THOMAS S. SPEAKMAN and RICHARD A. STRATTON, of the city of Philadelphia, in the State of Pennsylvania, have made a new and useful Improvement in Apparatus for Boring the Earth, by means of which improved instrument the holes bored by the ordinary apparatus may be enlarged at their lower ends so as to form a cavity or chamber laterally, either in earth or rock, as the case may be; and we do hereby declare that the following is a full and exact description of our improvement.

In the accompanying drawings Figure 1, is a perspective view of our improved instrument, and Fig. 2 a vertical section thereof along its center; the other figures show the respective parts in detail. In each of these where the same parts are shown, they are designated by the same letters of reference.

A A is a hollow shaft, or tube of iron, of such length and diameter as shall adapt it to the hole, or bore, the lower part of which is to be enlarged. To the upper end of this shaft is adapted a cap B (Fig. 3) having a hole through its center to receive a screw, C, that is furnished with handles D, D, by which it may be turned. At the lower part of the tube A there are two cutters, E, E, that are attached to the bottom of the tube by a joint pin, or bolt F upon which they work. The cutters may have their edges serrated as shown in the drawing, or may be otherwise so formed as to adapt them to the cutting of the particular soil, or rock upon which they are to operate. When inserted into or removed from the hole, they are made to pass into slots, or openings, L, in the tube A, most distinctly seen in Fig. 4. To draw them into this situation and to hold them there, they have wires, or chains K K attached to their upper ends as at W; these wires or chains pass up through the tube A A, entering it at the upper ends of the slots L, and passing out through openings at N, N, where they may be drawn upon so as to cause the cutters E E to stand within the slots. The wire, or chain, and cutters are shown separately in Fig. 5.

To force the cutters E E apart, we employ a rod T, T, shown separately in Fig. 6; upon the upper end of this rod the screw C operates with the necessary force. The lower end of the rod T is so formed as to adapt it to act on the back of the cutters E E; it may be in one piece with the screw C, or the two parts may be connected by a swivel-joint. To cause the tube A with its appendages to revolve, we attach a handle S S to it by means of a key P, or otherwise, the requisite power must, of course, be applied to this handle. H, seen separately at Fig. 7, is a frustum of a cone, perforated so as to receive the tubular shaft A; this conical piece is to be placed in the opening in the upper end of the bore, which, if in rock, will hold it with sufficient firmness; in other situations it must be confined in place by any suitable means. G is a collar that is to be attached to the shaft A, by a screw I, this is to rest on the upper part of the piece H, and may be shifted as the lateral excavation proceeds, which may be thereby commenced in any part of the bore, and continued to any required extent.

There are many situations in which water can be obtained by boring; but where it will not rise so as to produce a spontaneous flow, while the quantity contained in the ordinary bored hole is insufficient for any useful purpose; it will be readily seen that in such situations the formation of a capacious reservoir, such as this apparatus will produce, is a matter of great importance; but the principal use of this instrument will be in the forming of a chamber for the blasting of rock.

Having thus fully described the nature of our improved apparatus for enlarging, or forming chambers within the openings made by boring the earth, or rocks, what we claim therein as new and desire to secure by Letters Patent, is—

The manner of constructing an instrument such as is herein described and represented, in which, expanding cutters are so combined with a tubular shaft, as that they may be received within it, and be made to open out by an arrangement of parts constructed for that purpose, and substantially in the manner herein set forth.

THOMAS S. SPEAKMAN. [L. S.]
RICHARD A. STRATTON. [L. S.]

Witnesses:
ARMON DAVIS,
W. D. BARNES.